No. 871,699. PATENTED NOV. 19, 1907.
C. HORIX.
CONCRETE REINFORCEMENT.
APPLICATION FILED NOV. 23, 1906.
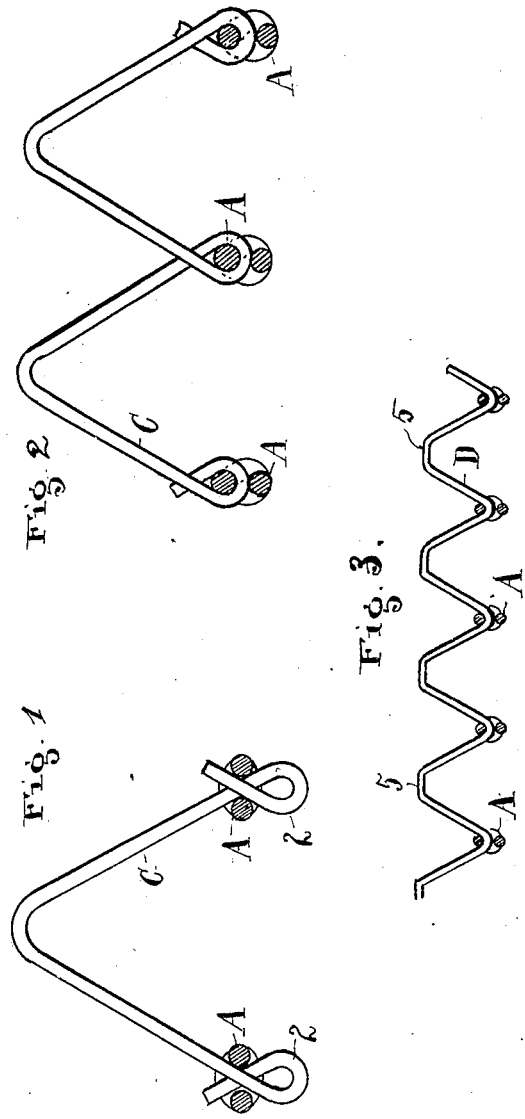
WITNESSES:
INVENTOR.
Carl Horix
BY
Fisher & Ulrert
ATTORNEYS

UNITED STATES PATENT OFFICE.

CARL HORIX, OF EAST CLEVELAND, OHIO.

CONCRETE REINFORCEMENT.

No. 871,699.

Specification of Letters Patent.

Patented Nov. 19, 1907.

Application filed November 23, 1906. Serial No. 344,675.

*To all whom it may concern:*

Be it known that I, CARL HORIX, a citizen of the United States, residing at East Cleveland, in the county of Cuyahoga and State of Ohio, have invented certain new and useful Improvements in Concrete Reinforcements, and do declare that the following is a full, clear, and exact description of the invention, which will enable others skilled in the art to which it appertains to make and use the same.

My invention relates to improvements in concrete re-inforcements, and the invention consists in a re-inforcement comprising a series of tension members or cables and continuous shear members interlocked transversely with said cables, all substantially as shown and described and particularly pointed out in the claims.

In the accompanying drawings Figure 1 is a cross-section of one form of the invention. Fig. 2 is a cross-section of the re-inforcement showing a modification of Fig. 1, and Fig. 3 is a cross-section of another modification of the re-inforcement showing still another manner of engaging the shear members with the cables.

A re-inforcement constructed after the manner of these illustrations, or within equivalent formations, has the material advantage over all other re-inforcements with which I am familiar in this particularly, that it can be made any desired width and length and is so constructed that it provides both a vertical and a horizontal support for the concrete, whereas woven wire re-inforcement acts only in a horizontal plane and has no such shear support.

The invention therefore consists in a re-inforcement comprising a number of horizontal members of any preferred form connected by vertically disposed continuous shear members inter-engaged in one way or another with all said horizontal members collectively and tying them all alike together laterally, thus making a unitary structure out of both the horizontal members and the shear members.

Now, having referred more especially to Fig. 1, the horizontal tension members or cables A are shown as made of two intertwined or twisted wires and shear members locked in said cables and whereby the structure may be extended to any desired width of re-inforcement with as many cables as may be desired. The said shear members C are shown in both Figs. 1 and 2, as substantially V shape in elevation, and in Fig. 1 the wire is inserted between the strands of the cable and bent to form a lock loop 2, thus depending on the swell of the loop to lock the shear member in or with the cable. In Fig. 2 the shear wires simply thread through the wires of the cables and are bent reversely or across each other above the cable, and runs from cable to cable continuously in the series.

This re-inforcement is especially adapted for floors, roofs and the like, wherein heavy weight or pressure is to be sustained and concrete itself or with mere horizontal re-inforcement is found insufficient.

In lieu of the twisted or double wire cables shown I might employ one or more straight wires, especially with style of shear member shown in Fig. 2.

Fig. 3 shows a further modification of the invention in which a double strand cable or tension member A is used similar to the others but has a continuous transversely arranged shear member bent into a series of substantially V shaped formations and threaded through the cables without a recurve or reverse bend as in Figs. 1 and 2. The said V portions are inverted between strands and have a straight bridge portion 5 at what would otherwise be the point thereof, which widens the hold in the cement. This also makes a form of re-inforcement which is comparatively easy or convenient to manufacture.

What I claim is:

1. As a new article of manufacture, a concrete re-inforcement comprising a series of tensile members and shear members extending from one tensile member to another in a continuous wire at right angles to said tensile members and having a single engagement with each member, the said shear members bent to substantially Λ shape between the said tensile members and standing alone at their top.

2. As a new article of manufacture, a re-inforcement for concrete floors, roofing and the like, consisting of a series of twisted tensile members and continuous shear members connecting said tensile members at right angles across the said series of members and projecting in substantially ∧ shape upward from one tensile member to another and said projections disconnected at their top.

3. As a new article of manufacture, a concrete re-inforcement having a series of parallel tensile cables formed of twisted wire and shear members running from one tensile cable to the other at right angles thereto and traversing the space above said cables from one to the other in substantially ∧ shape.

In testimony whereof I sign this specification in the presence of two witnesses.

CARL HORIX.

Witnesses:
  R. B. MOSER,
  H. T. FISHER.